US008548743B2

(12) United States Patent
Lovell (10) Patent No.: US 8,548,743 B2
(45) Date of Patent: Oct. 1, 2013

(54) METHOD AND APPARATUS TO MONITOR REFORMATION AND REPLACEMENT OF $CO_2/CH_4$ GAS HYDRATES

(75) Inventor: John R. Lovell, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 407 days.

(21) Appl. No.: 12/832,148

(22) Filed: Jul. 8, 2010

(65) Prior Publication Data

US 2011/0029273 A1    Feb. 3, 2011

Related U.S. Application Data

(60) Provisional application No. 61/224,636, filed on Jul. 10, 2009.

(51) Int. Cl.
| | |
|---|---|
| *G06F 11/30* | (2006.01) |
| *G06F 17/40* | (2006.01) |
| *G06F 19/00* | (2011.01) |
| *G01V 9/00* | (2006.01) |

(52) U.S. Cl.
USPC .... 702/12; 73/152.01; 73/152.33; 73/152.39; 73/152.42; 73/865.8; 166/261

(58) Field of Classification Search
USPC ............ 73/53.01, 61.41, 61.43, 61.46, 61.76, 73/152.01, 152.18, 152.29, 152.33, 152.39, 73/152.42, 865.8; 166/244.1, 250.01, 251.1, 166/256, 257, 260, 261; 340/500, 540; 702/1, 702/2, 6, 11, 12, 127, 130, 136, 182, 187, 702/189; 703/6, 9, 10; 708/100, 105, 200

IPC ..................... E21B 47/00,47/06, 47/065, 49/00, E21B 49/003; G01V 9/00; G06F 11/00, 11/30, G06F 11/32, 17/00, 17/40, 19/00

See application file for complete search history.

(56) References Cited

U.S. PATENT DOCUMENTS

| | | | |
|---|---|---|---|
| 6,618,677 B1 | 9/2003 | Brown | |
| 6,733,573 B2 | 5/2004 | Lyon | |

(Continued)

FOREIGN PATENT DOCUMENTS

| | | |
|---|---|---|
| WO | 2009068957 A1 | 6/2009 |
| WO | 2009083243 A1 | 7/2009 |

OTHER PUBLICATIONS

Komai, Takeshi, et al., "Equilibrium Properties and Kinetics of Methane and Carbon Dioxide Gas Hydrate Formation/ Dissociation"; Preprints, Div. of Fuel Chemistry, ACS National Meeting 1997, San Francisco; pp. 568-572.

(Continued)

*Primary Examiner* — Edward Cosimano (57) ABSTRACT

A method for monitoring production from a methane hydrate reservoir includes obtaining a plurality of temperature measurements in a wellbore connected with the methane hydrate reservoir; and deriving a parameter relating to conversion of methane hydrate to carbon dioxide ($CO_2$) hydrate by injection of liquid $CO_2$, wherein the deriving uses a modeling program and the plurality of temperature measurements, wherein the modeling program uses at least one parameter relating to a thermodynamic properties that are substantially different between methane and $CO_2$. The at least one parameter relating to thermodynamic properties may include Joule-Thomson coefficients of methane and $CO_2$. The parameter relating to the conversion of methane hydrate to $CO_2$ hydrate may include a ratio of methane and $CO_2$ in a mixed fluid.

18 Claims, 3 Drawing Sheets

(56) References Cited

U.S. PATENT DOCUMENTS

| | | | |
|---|---|---|---|
| 6,973,968 B2* | 12/2005 | Pfefferle | 166/260 |
| 6,978,837 B2* | 12/2005 | Yemington | 166/303 |
| 7,343,971 B2* | 3/2008 | Pfefferle | 166/260 |
| 7,513,306 B2* | 4/2009 | Pfefferle | 166/260 |
| 7,526,953 B2 | 5/2009 | Goodwin et al. | |
| 7,617,873 B2 | 11/2009 | Lovell et al. | |
| 7,640,977 B2 | 1/2010 | Jonas | |
| 7,963,328 B2* | 6/2011 | Khinkis et al. | 166/265 |
| 2005/0016725 A1* | 1/2005 | Pfefferle | 166/260 |
| 2005/0103498 A1* | 5/2005 | Yemington | 166/302 |
| 2005/0149264 A1 | 7/2005 | Tarvin et al. | |
| 2005/0284628 A1* | 12/2005 | Pfefferle | 166/260 |
| 2006/0113079 A1* | 6/2006 | Yemington | 166/302 |
| 2007/0151733 A1* | 7/2007 | Yemington | 166/302 |
| 2007/0227727 A1 | 10/2007 | Patel et al. | |
| 2008/0121393 A1* | 5/2008 | Pfefferle | 166/257 |
| 2008/0201080 A1 | 8/2008 | Lovell et al. | |
| 2008/0236820 A1* | 10/2008 | Yemington | 166/257 |
| 2009/0032248 A1* | 2/2009 | Svoboda et al. | 166/249 |
| 2009/0178805 A1* | 7/2009 | Yemington | 166/256 |
| 2009/0182509 A1 | 7/2009 | Kimminau et al. | |
| 2009/0192768 A1 | 7/2009 | Zue et al. | |
| 2009/0235731 A1 | 9/2009 | Zue et al. | |
| 2010/0163223 A1 | 7/2010 | Brown | |
| 2010/0193180 A9* | 8/2010 | Ikegawa | 166/249 |
| 2010/0243245 A1* | 9/2010 | Khinkis et al. | 166/260 |

OTHER PUBLICATIONS

Pinzon, I.D., et al., SPE Paper 110064 entitled "Monitoring Production From Gravel-Packed Sand-Screen Completions on BP's Azeri Field Wells Using Permanently Installed Distributed Temperature Sensors"; SPE International, 2007 SPE Annual Technical Conference and Exhibition held in Anaheim, California, USA, Nov. 11-14, 2007; 16 pages.

Witterholt, E. J., et al., "Temperature Logging in Injection Wells"; Society of Petroleum Engineers of AIME, Paper No. SPE 4022, 47th Annual Fall Meeting of the Society of Petroleum Engineers of AIME, held in San Antonio, Texas, Oct. 8-11, 1972; 10 pages.

Kunz, et al., "Temperature Surveys in Gas Producing Wells"; SPE 472-G, AIME Annual Meeting, held in Chicago, Feb. 13-17, 1955; vol. 204; T. P. 4077; pp. 111-119.

Amara, M., et al., "Coupling of Darcy-Forchheimer and Compressible Navier-Stokes Equations With Heat Transfer"; SIAM Journal of Scientific Computing, vol. 31, No. 2; Jul. 31, 2008; DOI: 10.1137/070709517; pp. 1470-1499.

* cited by examiner

METHOD AND APPARATUS TO MONITOR REFORMATION AND REPLACEMENT OF $CO_2/CH_4$ GAS HYDRATES

CROSS-REFERENCE TO RELATED APPLICATIONS

This application claims priority of a provisional application No. 61/224,636, filed on Jul. 10, 2009, the disclosure of which is incorporated by reference in its entirety. This provisional application is now expired.

BACKGROUND OF INVENTION

1. Field of the Invention

The present invention generally relates to measurements of fluid flows in downhole applications, more particularly to the use of measurements to determine gas ratios in the fluid flows, and other related applications.

2. Background Art

Natural gas hydrates, such as methane hydrates, may be formed from natural gas (e.g., methane) and water by the decomposition of microorganisms at low temperature and high pressure. Natural gas hydrates are abundant around the world, including large known deposits below permafrost and in deep sea beds. Energy-supply research estimates indicate that these natural gas hydrates contain more energy than all other fossil fuel deposits combined. However, technology needed to recover large amounts of natural gas from hydrate has proven to be economically challenging.

Research programs are underway to reform natural gas hydrate to produce large volumes of useable hydrocarbon fuels, particularly methane ($CH_4$), by injection of liquid $CO_2$ into the natural gas ($CH_4$) hydrate to convert the natural gas hydrate into $CO_2$ hydrate and $CH_4$ gas. Thus, natural gas can be released in a form that can be readily recovered using conventional means. For example, Komai et al. (Preprints, Div. of Fuel Chemistry, ACS National Meeting 1997, San Francisco, 568-572) discuss the use of liquid $CO_2$ to convert methane hydrates and release $CH_4$ gases while absorbing $CO_2$. This may represent a cost-effective and environmentally safe method for simultaneous $CO_2$ sequestration and $CH_4$ production during conversion of the hydrates.

The conversion of $CH_4$ hydrate into $CO_2$ hydrate is a near thermo-neutral process, and, therefore, there is no need to supply heat to the hydrates. Although $CO_2$ hydrate is known to be slightly more stable than $CH_4$ hydrate under the same pressures and temperatures, this does not mean that the conversion is straightforward. For example, too much pumped liquid $CO_2$ may fracture the rock, whereas too little liquid $CO_2$ may lead to conversion only on the exterior of $CH_4$ crystals. One way to overcome this problem is by adding acid catalysts to the pumped liquid $CO_2$ to speed up the conversion from liquid $CO_2$ and methane hydrate to $CO_2$ hydrate and gaseous methane. For example, U.S. Pat. No. 6,733,573, issued to Lyon, discloses the use of acid catalysts to accelerate the conversion. However, this method also comes with its own challenges, e.g., too much of acid catalysts may cause the wellbore to collapse, etc.

Therefore, there is a need to monitor both the downhole conversion of $CH_4$ hydrate into $CO_2$ hydrate and the ratios of the two components in fluids produced to the surface. To ensure efficient operations, it would be appropriate to also monitor the production of water from any of the zones, because water production may cause the rapid formation of hydrates, which may plug the wellbore.

SUMMARY OF INVENTION

One aspect of the invention relates to methods for monitoring production from a methane hydrate reservoir. A method in accordance with one embodiment of the invention includes obtaining a plurality of temperature measurements in a wellbore connected with the methane hydrate reservoir; and deriving a parameter relating to conversion of methane hydrate to carbon dioxide ($CO_2$) hydrate by injection of liquid $CO_2$, wherein the deriving uses a modeling program and the plurality of temperature measurements, wherein the modeling program uses at least one parameter relating to a thermodynamic properties that are substantially different between methane and $CO_2$. The at least one parameter relating to thermodynamic properties may include Joule-Thomson coefficients of methane and $CO_2$. The parameter relating to the conversion of methane hydrate to $CO_2$ hydrate may include a ratio of methane and $CO_2$ in a mixed fluid.

One aspect of the invention relates to systems for monitoring production from a methane hydrate reservoir. A system in accordance with one embodiment of the invention includes: a temperature sensing system for measuring temperature in a well connected with the methane hydrate reservoir; and a processor having a program for determining, based on temperatures measured by the temperature sensing system, a ratio of components in a mixed fluid, wherein the program makes use of a thermodynamic property of individual components in the mixed fluid.

One aspect of the invention relates to systems for monitoring production from a methane hydrate reservoir. A system in accordance with one embodiment of the invention includes a processor and a memory storing a program having instructions for: deriving a parameter relating to conversion of methane hydrate to carbon dioxide ($CO_2$) hydrate by injection of liquid $CO_2$, wherein the deriving uses a modeling program and a plurality of temperature measurements obtained in a wellbore connected with the methane hydrate reservoir, and wherein the modeling program uses at least one parameter relating to a thermodynamic properties that are substantially different between methane and $CO_2$.

Other aspects and advantages of the invention will be apparent from the following description and the appended claims.

DETAILED DESCRIPTION

Embodiments of the present invention relate to methods and systems for monitoring production of natural gas ($CH_4$)

from conversion of methane ($CH_4$) hydrate by injection of liquid $CO_2$. Embodiments of the invention use well measurements (e.g., temperature and pressure measurements) to monitor production of $CH_4$ from gas hydrate by injection of liquid $CO_2$. In accordance with embodiments of the invention, the ratios of $CH_4$ and $CO_2$ may be determined by taking advantage of the different thermodynamic properties of the two components. In particular, ratios of $CH_4$ and $CO_2$ may be derived from monitoring the Joule-Thompson coefficients of the produced fluids.

In accordance with embodiments of the invention, the flow properties may be derived from temperature measurements, which may be obtained using any suitable sensors and systems known in the art, such as digital temperature sensors, optical sensors (e.g., based on Raman or Fiber-Bragg technology) or traditional distributed temperature sensing (DTS) systems, among others. Some embodiments of the invention also make use of additional sensors (e.g., pressure sensors), which may provide additional information to help produce more stable inversion.

Methods for monitoring flow rates from temperature measurements in conventional oil wells are known in the art. For example, U.S. Patent Application Publication No. 2005/0149264, by Tarvin et al., discloses a distributed temperature sensor system to measure a temperature profile in a well, which is processed according to a well model that relates thermal characteristics (e.g. thermal decay and/or amplitude of a thermal discontinuity at an injection point) to flow rates.

Similarly, Pinzon et al, in SPE Paper 110064, entitled "Monitoring Production from Gravel-Packed Sand-Screen Completions on BP Azeri Field Wells using Permanently Installed Distributed Temperature Sensors," discloses the use of a permanently installed fiber-optic distributed temperature monitoring system to monitor production rates and changes over time.

U.S. Pat. No. 6,618,677, issued to Brown, also discloses a fiber optic sensor system for providing temperature information to determine the mass flow rates of produced fluids within a well bore. According to this method, mass flow rates of fluids in a conduit in contact with heat sinks differing in temperature from the fluids are determined by: (1) obtaining a distributed temperature profile of fluid flowing along a length of conduit using optical data obtained from a length of optical fiber in thermal contact therewith, (2) obtaining a profile of the heat sink temperature external to the conduit, and (3) deriving mass flow rates of fluids in the conduit from the said profiles and from measured thermal transfer parameters.

Figure 1:
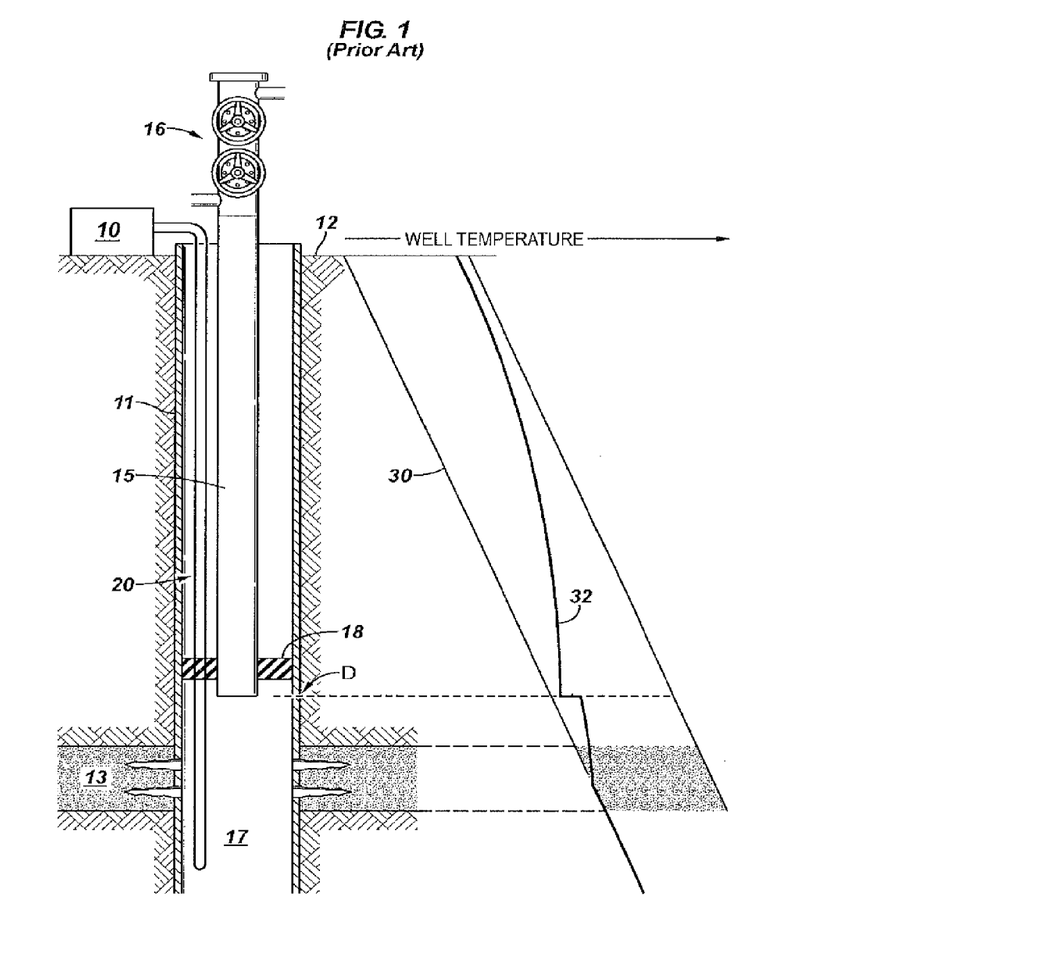
FIG. 1 shows a schematic illustration of a prior art wellbore for using temperature measurements to estimate flow rates.

Embodiments of the invention may use any suitable methods for temperature measurements and flow characterization in a well. For example, FIG. 1 shows a prior art fiber optic system for measuring temperatures and for analyzing flow characteristics in a well according to U.S. Pat. No. 6,618,677, issued to Brown.

FIG. 1 shows an oil well with a casing 11 extending from the surface 12 through a producing reservoir 13. A production tubing 15 is installed inside the casing 11 from a flow control apparatus 16 through a production packer 18 to reach a producing zone 17. An optical fiber is deployed in a suitable duct 20 for temperature measurements. The fiber optic system 10 includes a light source (a laser), a light detector, and a data processing unit. The processing unit is for interpreting temperature- and location-related characteristics of the returned light in terms of the temperature profile at a series of locations along the fiber.

The graph on the right hand side of FIG. 1 illustrates temperature profiles along the length of the well. The natural geothermal profile 30 is a straight line relation between the depth D and temperature. It may be derived from simple temperature measurements, using conventional sensors, at different depths. Curve 32 represents a distributed temperature profile of the fluids in the production tubing. As fluid enters the well from the reservoir and rises in the production tubing, it passes into cooler regions and begins to lose heat to the surrounding formations. Depending on flow rates, thermal conductivities and the like, the temperature of the fluid rising in the well falls at different rates. Therefore, the mass flow rates of the fluids may be determined based on the distributed temperature profiles using predetermined algorithms. Two exemplary methods (algorithms) are disclosed in U.S. Pat. No. 6,618,677, the disclosure of which is incorporated by reference.

In injection wells, methods for determining flow properties using the temperature measurements along the sandface are also available. The temperatures can be monitored during injection. In addition, the temperatures can also be monitored after injection, as the temperatures of the reservoir increase. See for example, Witterholt and Tixier, "Temperature Logging in Injection Wells," SPE 4022, and for gas production, Tixier and Kunz, "Temperature Surveys in Gas Producing. Wells," AIME Annual Meeting, Chicago 1955.

Some embodiments of the invention relate to measuring the hydrate conversion—i.e., conversion from $CH_4$ hydrate to $CO_2$ hydrate. As noted above, in a typical operation, liquid $CO_2$ is pumped downhole to displace $CH_4$ from the hydrate. Such conversion, though thermally neutral, is not always facile. Therefore, monitoring of such conversions is important to ensure that the conversion is efficient.

A method for monitoring the $CO_2$ and $CH_4$ conversion in accordance with embodiments of the invention may include the steps of: (1) measuring the temperatures along sections of a completion as liquid. $CO_2$ is being injected into a wellbore, (2) allowing the wellbore to warm up while monitoring the temperature changes, and (3) then making inferences regarding the conversion of $CH_4$ hydrate to $CO_2$ hydrate and the radial penetration of the liquid $CO_2$ based on the temperature profiles.

In accordance with embodiments of the invention, the making inference (deriving) may be performed by combining the temperature measurements with a modeling program that can solve the hydrate conversion and iterate between the computed temperatures and the measured warm-back temperatures. Any suitable temperature modeling software may be used, such as that sold by Schlumberger under the trade name THERMA™.

Some embodiments of the invention relate to using temperature (and optionally pressure) measurements performed at post-injection of liquid $CO_2$ to determine the ratios of $CH_4$ to $CO_2$ in the produced fluids. A method in accordance with one embodiment of the invention, for example, may include the steps of: (1) allowing the reservoir to flow, (2) measuring the temperatures at points along the sandface, (3) passing those temperature measurements to a modeling package (program) that can distinguish between the thermodynamic properties of $CH_4$ to $CO_2$, and (4) deriving estimated ratios of $CH_4$ to $CO_2$ along the sandface using the modeling program. The modeling program may also provide flow profiles along the sandface, as in traditional distributed temperature sensing (DTS) monitoring. In addition, the program may take into account the thermodynamic components from the warming of the gases, as they flow to the surface.

Alternatively, ratios of mixed fluids may be determined by taking advantage of the changes in thermodynamic properties over time as the wellbore pressure changes (e.g., in a drawdown) and/or as the gases warm up when returning to the surface. The thermodynamic properties, such as the Joule-Thomson coefficients, of the mixed fluids may be measured. Once the estimated Joule-Thomson coefficients of the mixed fluids are obtained, the ratios of those fluids may be determined based on the standard mixing laws and the Joule-Thomson coefficients of the individual fluids.

To obtain measurements needed to estimate the $CO_2$—$CH_4$ conversion or the ratios of these two components in the produced fluids, wells may be completed with sensors installed in the well in the production zones and along the length of the wells. Various methods for installing various sensors (e.g., temperature and pressure sensors) in the wells are known in the art. Any of such methods may be used with embodiments of the invention.

For example, U.S. Patent Application Publication No. 20080201080, "Method and Apparatus to Derive Flow Properties Within a Wellbore by J. Lovell, et al discloses the positioning of temperature sensors along the sandface to optimize their ability to measure Joule-Thomson components. U.S. Patent Application Publication No. 2009/0182509, by Kimminau et al., entitled "Combining Reservoir Modeling with Downhole Sensors and Inductive Coupling," discloses methods for determining flow properties by using digital sensors on the sandface, together with reservoir modeling software.

Figure 2:
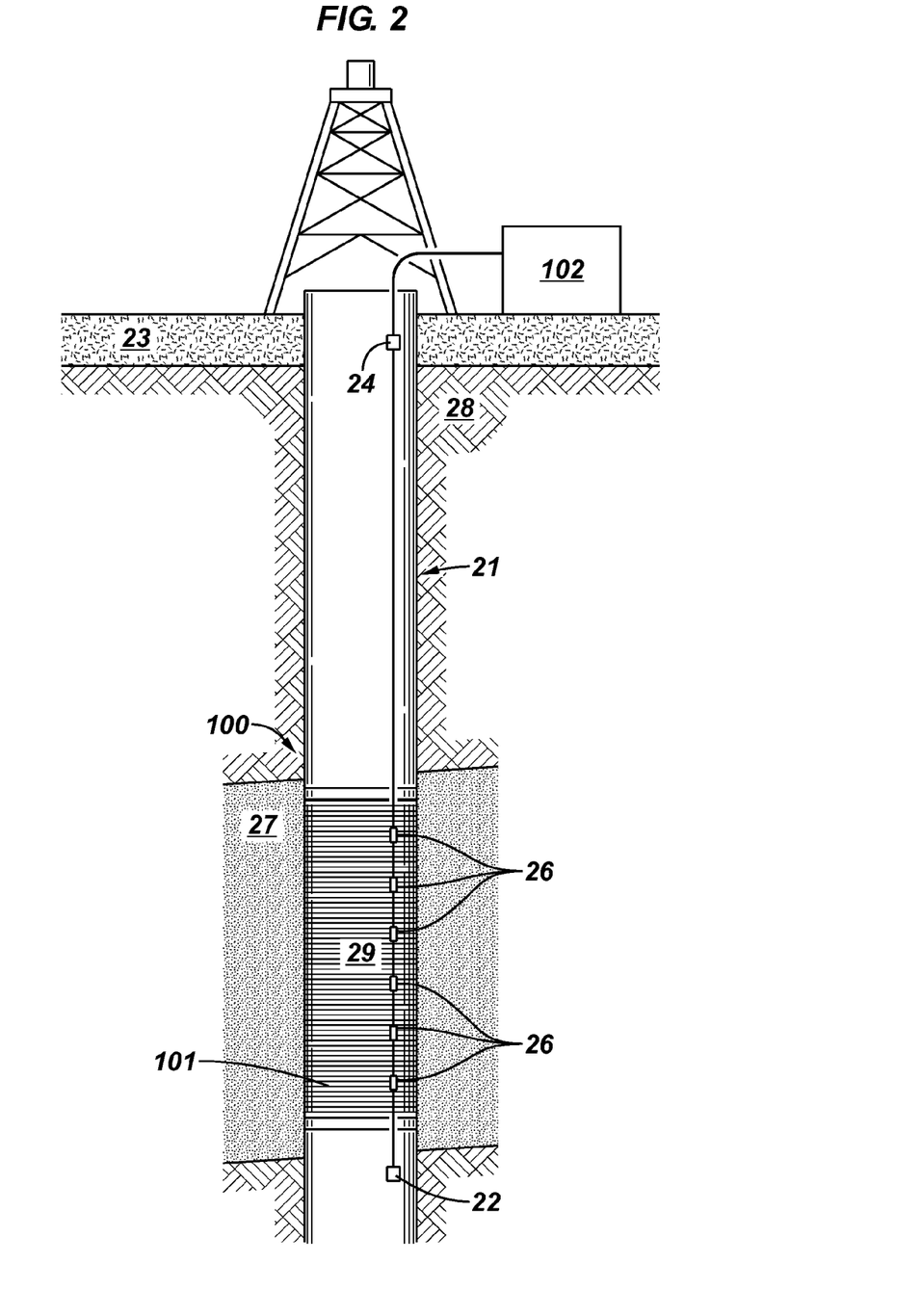
FIG. 2 shows a schematic illustration of a wellbore for production from methane hydrate reservoirs in accordance with one embodiment of the invention.

FIG. 2 shows an example of a well system for determining gas ratios and measuring flow profiles in accordance with one embodiment of the invention. As shown, a well 21 may be drilled into a layer of permafrost 23 above the surface of earth 28. The natural gas hydrates, such as $CH_4$ hydrates, may be located under the permafrost 23 in a reservoir 27. The well 21 may be completed with a lower completion hardware 100, which may allow for injection of liquid $CO_2$ and subsequent production of $CO_2$ and $CH_4$ back to the surface 25. Parameters, such as temperatures and pressures, along a sandface 101 or sandscreen 29 may be measured and subsequently transmitted to a data analysis location 102.

In some cases, a well 21 may be completed in one or more stages. When completed in multiple sections, the sensors may communicate across section boundaries via inductive couplers. See e.g., U.S. Patent Application Publication No. 2007/0227727, by Patel et al.

If the well is dual-stage or multi-stage completions, suitable wet-mates connectors may be used to connect these various stages. For example, if a well is dual stage and the measurements are made by using pumped optical fibers, then a pumpable cable wet-mate, may be used for the connections between the stages, as disclosed, for example, in U.S. Pat. No. 7,640,977, "System and method for connecting multiple stage completions," by J. Jonas. If the optical measurements are made using permanent cables in a dual stage completion, then optical wet-mates (e.g., SEAOPTIC™ Downhole Wet Mateable Fibre Optic Connectors from Diamould, Cumbria, England) may be used. If digital measurements are made, these measurements may be made with wireless sensors powered by downhole batteries or downhole PDC control lines.

In addition, in a well with a dual stage completion, inductive couplers may be used to power a sandface array of digital temperature measurement and quartz pressure/temperature (P/T) gauges 22 provided at the bottom of the well, and P/T gauges 24 at the upper completion. The sensors, such as distributed temperature sensors 26, may be located outside the lower completion (e.g. in cement, outside of a casing) or inside the lower completion (e.g. on a stinger or clamped to the exterior of a sandscreen 29). Some of the downhole components may be retrievable, e.g. a downhole pump.

The temperature measurements may be optical measurements or a series of digital point measurements, such as platinum RTDs (resistance temperature detectors). Examples of optical measurements, for example, may be found in U.S. Pat. No. 6,618,677, issued to Brown. RTDs are available from various commercial suppliers, for example, Omega Engineering, Inc. (Stamford, Conn.).

The downhole data may be transmitted to the surface using various wellbore communication techniques. The downhole data may be combined with surface measurements, such as flow-rates and average chemical compositions. The merged data can be subsequently transmitted to a reservoir modeling software program for interpretation of the ratios of $CO_2$ to $CH_4$ and for providing flow profiles along the reservoir.

While FIG. 2 illustrates one completion design, one skilled in the art would appreciate that embodiments of this invention may be applied to a variety of alternative completion designs.

Some embodiments of the invention may use passive temperature sensors, such as resistive-temperature-devices (RTDs). These devices may be mounted on a screen on the sandface. The screen may have flowing and non-flowing sections. The sensors may be deployed inside or exterior to a completion stage. The completion stage may include a fracturing operation, in which case the sensors can be positioned so as to avoid penetration or damage by the fracturing apparatus. The sensors can be permanently positioned in the casing, or alternatively they can be deployed in a temporary assembly. An example of the latter scenario is to deploy a fiber optic line inside coiled tubing, as disclosed in U.S. Pat. No. 7,617,873, "System and methods using fiber optics in coiled tubing," by J. Lovell et al.

The temperature sensors are governed by the equations of conservation of mass, or momentum and mass. For traditional DTS Operations, temperature differences of many degrees Centigrade may be observed. During $CO_2$—$CH_4$ operations, temperature measurements may fluctuate by less than 1 degree C. This requires that the sensor apparatus have a high resolution and low drift, both of which are properties of platinum RTD's. A corresponding requirement is that the system of equations to be solved should be able to identify these anomalies. The Navier-Stokes formulation in the wellbore is one such system of equations that can be used, although those skilled in the art will recognize that other algorithms may also be used. Therefore, the choice of wellbore algorithm should not be viewed as a limitation of the invention.

Because the $CO_2$ and $CH_4$ fluids are compressible, a constant density formulation cannot be assumed. Instead, the fluids in the wellbore should satisfy:

$$u \frac{\partial \rho}{\partial r} + w \frac{\partial \rho}{\partial z} + \rho div = 0,$$

where $$div = \frac{1}{r} \frac{\partial (ru)}{\partial r} + \frac{\partial w}{\partial z},$$

where $\rho$ is the fluid density, u the radial velocity and w the axial velocity, where Favre averages have been taken over time to take into account turbulence.

Across interfaces, such as where the gas enters or leaves the wellbore, mass conservation becomes a statement of continuity of $\rho$ u in the direction perpendicular to that interface.

The system of equations should also conserve momentum. For turbulent fluid flow that momentum conservation is well represented by the Reynolds Averaged Navier-Stokes equation. One can make the assumption that the fluids are isotropic Newtonian. Thus, in the wellbore, $$\rho u \frac{\partial u}{\partial r} + \rho w \frac{\partial u}{\partial r} = -\frac{\partial p}{\partial r} + \frac{1 \partial (r \tau_{rr})}{\partial r} + \frac{\partial \tau_{rz}}{\partial z} - \frac{\tau_{\phi\phi}}{r}$$

$$\rho u \frac{\partial w}{\partial r} + \rho w \frac{\partial w}{\partial z} = -\frac{\partial p}{\partial z} + \frac{1 \partial (r \tau_{rz})}{\partial r} + \frac{\partial \tau_{zz}}{\partial z}$$

With apparent shear stresses:

$$\tau_{rr} = (\mu + \rho \epsilon_M)\left(z\frac{\partial u}{\partial r} - \frac{2}{3} div\right)$$

$$\tau_{zz} = (\mu + \rho \epsilon_M)\left(z\frac{\partial w}{\partial z} - \frac{2}{3} div\right)$$

$$\tau_{\phi\phi} = (\mu + \rho \epsilon_M)\left(\frac{2u}{r} - \frac{2}{3} div\right)$$

$$\tau_{rz} = (\mu + \rho \epsilon_M)\left(\frac{\partial u}{\partial r} + \frac{\partial w}{\partial z}\right)$$

wherein $\mu$ is viscosity and $\epsilon_M$ is the eddy diffusivity of momentum.

In a reservoir surrounding the rock, the momentum of a gas is well covered by the Darcy-Forcheimer equations:

$$\frac{\mu}{K} u + F\rho u \sqrt{u^2 + w^2} + \frac{\partial p}{\partial r} = 0$$

$$\frac{\mu}{K} w + F\rho w \sqrt{u^2 + w^2} + \frac{\partial p}{\partial z} = 0$$

where K is permeability, F is the Forcheimer factor, and gravity effects are ignored.

There remains the need to define energy conservation, in the wellbore $$\rho C_p \left(u \frac{\partial T}{\partial r} + w \frac{\partial T}{\partial z}\right) = \frac{1}{r}\frac{\partial}{\partial r}\left(\lambda r \frac{\partial T}{\partial r}\right) + \frac{\partial}{\partial z}\left(\lambda \frac{\partial T}{\partial z}\right) + \beta T \left(u \frac{\partial p}{\partial r} + w \frac{\partial p}{\partial z}\right) + \Phi$$

where $\phi$ is the energy dissipated by friction, $\beta$ is thermal expansion, $C_p$ is heat capacity and $\lambda$ includes a turbulent term $$\lambda = k + \frac{\epsilon_M}{Pr_T},$$

where k is the thermal conductivity and $Pr_T$ is the turbulent Prandtl number. For $CO_2$—$CH_4$ analysis, this dissipation factor is not important in the wellbore, although an optimal configuration does take that factor into account in the reservoir, where $$\Phi = u \frac{\partial p}{\partial r} + w \frac{\partial p}{\partial z}$$

was found to give good results. Conversely, in the wellbore it was found optimal to consider a turbulent component to the temperature conduction but not in the porous medium, where instead k can be set equal to the average conductivities of matrix and fluid, with the weighting given by porosity. The equation for the porous medium becomes $$\rho_f C_{pf}\left(u \frac{\partial T}{\partial r} + w \frac{\partial T}{\partial z}\right) = \frac{1}{r}\frac{\partial}{\partial r}\left(kr \frac{\partial T}{\partial r}\right) + \frac{\partial}{\partial z}\left(k \frac{\partial T}{\partial z}\right) + (\beta T - 1)\left(u \frac{\partial p}{\partial r} + w \frac{\partial p}{\partial z}\right)$$

Further background into these equations can be found, for example, in "Coupling of Darcy-Forcheimer and compressible Navier-Stokes equations with Heat Transfer," by M. Amara, et al, SIAM Journal of Scientific Computing, 2008.

These equations can be solved as a separate standalone program (finite element or finite difference) or can be combined into existing reservoir simulators. Turbulence terms are reviewed in detail in standard textbooks on heat transfer.

For insight into the porous media equation, one can note that the conductivity terms are much less than the other terms in the equation so that $$\rho_f C_{pf}\left(u \frac{\partial T}{\partial r} + w \frac{\partial T}{\partial z}\right) \approx (\beta T - 1)\left(u \frac{\partial p}{\partial r} + w \frac{\partial p}{\partial z}\right)$$

and hence $\rho_f C_{pf} \Delta T \approx (\beta T - 1)\Delta p$

The ratio $$\frac{\Delta T}{\Delta p} \approx \frac{\beta T - 1}{\rho_f C_{pf}}$$

is called the Joule-Thomson effect and is an empirically derived thermodynamic property. It typically varies with both pressure and temperature, as do the density, compressibility and viscosity terms. The thermodynamic properties of $CO_2$ and $CH_4$ under various conditions can be found in technical handbooks or from the National Institute of Standards and Technology (NIST).

Analysis of those values shows that the Joule-Thomson coefficients of $CO_2$ and $CH_4$ are substantially different. For example, if the wellbore is at 300 psia and the temperature varies from −20° C. to 20° C., then the Joule-Thomson coefficient of $CH_4$ varies from 0.07° F./psia to 0.05° F./psia. Under the similar pressure, $CO_2$ is a liquid below −18.402° C. with a Joule Thomson coefficient ~0.001° F./psia, and above −18.402° C., the Joule-Thomson coefficient of gaseous $CO_2$ increases to 0.21° F./psia, followed by a slow decrease to 0.143° F./psia at 20° C.

Among various thermodynamic properties, the Joule-Thomson coefficients of $CO_2$ and $CH_4$ are particularly useful because these coefficients are substantially different under most conditions seen during $CO_2$—$CH_4$ sequestration.

Joule-Thomson analysis has previously been used to differentiate between oil and water, as detailed, for example, in U.S. Patent Application Publication No. 2010/0163223, "Method for Determining Reservoir Properties in a Flowing Well", by G. Brown.

The different Joule-Thomson coefficients make it feasible to estimate the ratios of these $CO_2$ and $CH_4$ components in a mixed fluid (liquid or gas). Once the ratios of $CO_2$ and $CH_4$ are determined, this parameter may be used to monitor the conversion from methane hydrate to $CO_2$ hydrate or to monitor the production fluids as they flow uphole.

Embodiments of this invention may also include reservoir modeling programs that incorporate knowledge of the thermodynamic properties of $CO_2$ and $CH_4$ as functions of temperature and pressure.

Similarly, thermodynamic properties of water may be obtained for monitoring water productions from the formation. The following description will use $CH_4$ and $CO_2$ as examples of how to monitor the production of a mixed fluid and how to monitor the ratios of the produced fluids. However, one skilled in the art would appreciate that the same methods may be applied to monitor other fluids (e.g., water). As noted above, monitoring water production from the formation is critical in order to prevent ice formation that would clog the production tubing.

Joule-Thomson effects predicts that the temperatures measured by the sensors will vary with pressure changes (e.g., in a drawdown). The equation, $\Delta T = C\_JT \times \Delta P$, correlates temperature changes with the pressure changes and Joule-Thomson coefficient ($C\_JT$). Because the Joule-Thomson coefficients of $CH_4$ and $CO_2$ are different, it is possible to monitor the Joule-Thomson effects as a function of pressure changes (e.g., in a drawdown) to identify the types of gases and ratios thereof produced along the sandface. A typical drawdown may produce 10 psi pressure drop, which will produce a measurable difference in temperature between $CO_2$ and $CH_4$. In addition, there will be a large change in the measured temperatures, if liquid $CO_2$ is produced versus gaseous $CO_2$.

For example, a producing well may have certain flow profiles in the wellbore.

When the wellhead pressure is reduced by say 50 psi, the pressure reduction will lead to corresponding changes in the drawdown across each sensor, thereby producing changes in the measured temperatures. The temperature changes can be used in a modeling program to derive an indication of the Joule-Thomson coefficients. In addition to temperature measurements, quartz pressure gauges may be added to the downhole hardware to provide pressure measurements, which can be used to help stabilize the inversion. In accordance with embodiments of the invention, at least two pressure gauges are preferably included in the wellbore for pressure measurements.

As noted above, embodiments of the invention relate to methods for monitoring the $CO_2$ and $CH_4$ conversion and for monitoring the compositions of the produced fluids from methane hydrate conversion. Methods of the invention are based on a plurality of temperature measurements obtained under different conditions. The plurality of temperature measurements are used in a modeling program, which makes use of differing thermodynamic properties of components in a mixed fluids to decipher the compositions of the mixed fluids. The temperature measurements for use with embodiments of the invention may be obtained under various conditions, such as in different locations in the wellbore, after pressure changes in the wellbore, or after changes in $CO_2$ injection.

Figure 3:
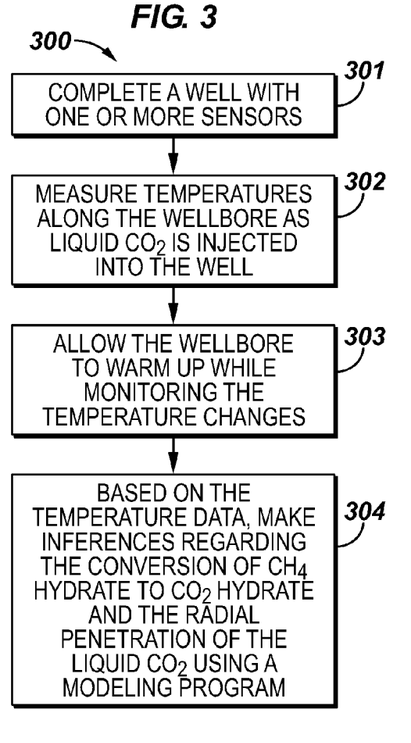
FIG. 3 shows a flowchart of a method for monitoring conversion of methane hydrate with liquid $CO_2$ in accordance with one embodiment of the invention.

FIG. 3 shows an exemplary method for monitoring the $CO_2$ and $CH_4$ conversion in a reservoir in accordance with one embodiment of the invention. The method 300 may include completing a well with one or more sensors for temperature measurements (Step 301). The method may not include the well completion step if performed with an exiting (complete) well. The sensors may also include sensors for measuring pressures and other well or fluid properties, such as flow rates, fluid density, fluid viscosity, fluid resistivity, etc. Using the sensors, temperatures along sections of the completion are measured, as liquid $CO_2$ is being injected into a wellbore (step 302). The temperature measurements may be made with optical sensors, digital sensors, etc. In addition, other well and fluid properties (e.g., pressure) may be measured.

Then, allow the wellbore to warm up while monitoring the temperature changes (step 303). The well may be allowed to warm up by slowing or stopping the injection of liquid CO2. Again, other data (e.g., pressure) may be measured together with the temperature data. The temperature data obtained in steps 302 and 303, together with other optional data (such as pressure data) may be used to make inferences regarding the conversion of $CH_4$ hydrate to $CO_2$ hydrate and the radial penetration of the liquid $CO_2$ using a modeling program (step 304).

Figure 4:
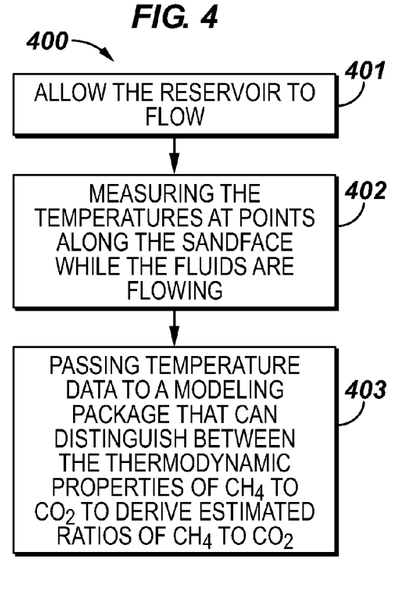
FIG. 4 shows a flowchart of a method for determining ratios of $CH_4$ and $CO_2$ in accordance with another embodiment of the invention.

Some methods of the invention relate to using temperature (and optionally pressure) measurements performed at post-injection of liquid $CO_2$ to determine the ratios of $CH_4$ to $CO_2$ in the produced fluids. For example, FIG. 4 shows a method 400 in accordance with one embodiment of the invention that includes the steps of: allowing the reservoir to flow (step 401); and measuring the temperatures at points along the sandface while the fluids are flowing (step 402). In addition, other parameters (e.g., pressure) may be measured to help stabilize the inversion.

The temperature measurements are then passed to a modeling package (program) that can distinguish between the thermodynamic properties of $CH_4$ to $CO_2$ to derive estimated ratios of $CH_4$ to $CO_2$ along the sandface using the modeling program (step 403). The modeling program may also provide flow profiles along the sandface, as in traditional distributed temperature sensing (DTS) monitoring. In addition, the program may take into account the thermodynamic components from the warming of the gases, as they flow to the surface.

Figure 5:
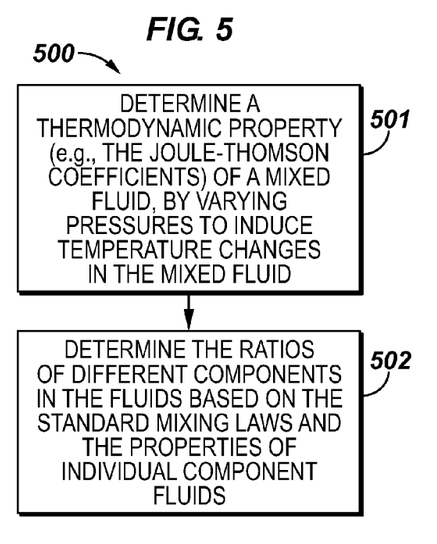
FIG. 5 shows a flowchart of a method for determining ratios of components in a mixed fluid in accordance with another embodiment of the invention.

According to some methods of the invention, ratios of mixed fluids may be determined by taking advantage of the changes in thermodynamic properties over time as the wellbore pressure changes (e.g., in a drawdown) and/or as the gases warm up when returning to the surface. For example, FIG. 5 shows a method 500 for determining fluid ratios based on changes in thermodynamic properties. First, a thermodynamic property (such as the Joule-Thomson coefficients) of the mixed fluids is determined, either over time as the well pressure changes or as the fluid temperature changes (step 501). Once the thermodynamic parameters (e.g., Joule-Thomson coefficient) of the mixed fluids are determined, the ratios of different components in the fluids may be determined based on the standard mixing laws and the parameters (e.g., Joule-Thomson coefficients) of the individual fluids (step 502).

Advantages of embodiments of the invention may include one or more of the following. Systems and methods of the invention may improve monitoring the conversion of $CH_4$ hydrate to $CO_2$ hydrate in a reservoir, the ratios of the produced $CH_4$ and $CO_2$, and the production of any other fluids (such as water). With the ability to monitor these parameters, efficient and safe conversion of abundant methane hydrates would become economically feasible. In addition, $CO_2$ can be sequestered, while $CH_4$ is produced.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for monitoring production from a methane hydrate reservoir, comprising:

obtaining a plurality of temperature measurements in a wellbore connected with the methane hydrate reservoir; and deriving a parameter relating to conversion of methane hydrate to carbon dioxide ($CO_2$) hydrate by injection of liquid $CO_2$, wherein the deriving uses a modeling program and the plurality of temperature measurements, wherein the modeling program uses at least one parameter relating to a thermodynamic properties that are substantially different between methane and $CO_2$.

2. The method of claim 1, wherein the at least one parameter relating to thermodynamic properties comprises Joule-Thomson coefficients of methane and $CO_2$.

3. The method of claim 1, wherein the parameter relating to the conversion of methane hydrate to $CO_2$ hydrate is a ratio of methane and $CO_2$ in a mixed fluid.

4. The method of claim 1, further comprising estimating an extent of radial penetration of the injected liquid $CO_2$.

5. The method of claim 1, wherein the plurality of temperature measurements are obtained at different depths in the wellbore while a produced mixed fluid flows uphole.

6. The method of claim 1, wherein the plurality of temperature measurements comprises:
a first set of temperature measurements obtained in a wellbore while injecting liquid $CO_2$ into the wellbore; and
a second set of temperature measurements obtained in the wellbore while allowing the wellbore to warm up.

7. The method of claim 6, the allowing the wellbore to warm up involves slowing or stopping the injecting of liquid $CO_2$.

8. The method of claim 1, wherein the plurality of temperature measurements are obtained after a change in pressure in the wellbore.

9. The method of claim 8, wherein the deriving comprises:
determining an apparent Joule-Thomson coefficient of a produced mixed fluid, based on a relationship between the pressure change and changes in the plurality of temperature measurements; and
deriving, based on a standard mixing law, a ratio of methane and $CO_2$ in the produced mixed fluid, using the apparent Joule-Thomson coefficient of the produced mixed fluid and individual Joule-Thomson coefficients of methane and $CO_2$.

10. The method of claim 8, wherein the pressure change is produced by a change in production rate.

11. The method of claim 8, wherein the deriving is based on $\Delta T = C\_JT \times \Delta P$, wherein $\Delta T$ is temperature change, $C\_JT$ is Joule-Thomson coefficient, and $\Delta P$ is pressure change.

12. A system for monitoring production from a methane hydrate reservoir, comprising:
a temperature sensing system for measuring temperature in a well connected with the methane hydrate reservoir; and
a processor having a program for determining, based on temperatures measured by the temperature sensing system, a ratio of components in a mixed fluid, wherein the program makes use of a thermodynamic property of individual components in the mixed fluid.

13. The system of claim 12, wherein the temperature sensing system comprises an optical sensor, a resistive-temperature sensor, or a passive temperature sensor.

14. The system of claim 12, wherein the thermodynamic property comprise Joule-Thomson coefficient.

15. A system for monitoring production from a methane hydrate reservoir comprising a processor and a memory storing a program having instructions for:
deriving a parameter relating to conversion of methane hydrate to carbon dioxide ($CO_2$) hydrate by injection of liquid $CO_2$,
wherein the deriving uses a modeling program and a plurality of temperature measurements obtained in a wellbore connected with the methane hydrate reservoir, and
wherein the modeling program uses at least one parameter relating to a thermodynamic properties that are substantially different between methane and $CO_2$.

16. The system of claim 15, wherein the at least one parameter relating to thermodynamic properties comprises Joule-Thomson coefficients of methane and $CO_2$.

17. The system of claim 15, wherein the parameter relating to the conversion of methane hydrate to $CO_2$ hydrate is a ratio of methane and $CO_2$ in a mixed fluid.

18. The system of claim 15, the program further comprising instructions for estimating an extent of radial penetration of the injected liquid $CO_2$.

* * * * *